(12) United States Patent
Amadon et al.

(10) Patent No.: US 10,415,592 B2
(45) Date of Patent: Sep. 17, 2019

(54) SHROUD FOR GAS TURBINE ENGINE (71) Applicant: United Technologies Corporation, Farmington, CT (US)

(72) Inventors: Colin G. Amadon, Kennebunk, ME (US); Kevin C. Eckland, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 287 days.

(21) Appl. No.: 15/299,886

(22) Filed: Oct. 21, 2016

(65) Prior Publication Data

US 2018/0112679 A1   Apr. 26, 2018

(51) Int. Cl.
| | |
|---|---|
| F04D 29/54 | (2006.01) |
| F02C 3/04 | (2006.01) |
| F04D 29/08 | (2006.01) |
| F04D 29/64 | (2006.01) |
| F01D 9/04 | (2006.01) |
| F02K 3/06 | (2006.01) |

(52) U.S. Cl.
CPC ........... *F04D 29/542* (2013.01); *F01D 9/042* (2013.01); *F02C 3/04* (2013.01); *F04D 29/083* (2013.01); *F04D 29/644* (2013.01); *F02K 3/06* (2013.01); *F05D 2220/323* (2013.01); *F05D 2230/60* (2013.01); *F05D 2240/35* (2013.01); *F05D 2240/80* (2013.01); *F05D 2260/30* (2013.01); *F05D 2300/431* (2013.01); *Y02T 50/671* (2013.01)

(58) Field of Classification Search
CPC ...... F01D 9/042; F04D 29/083; F04D 29/542; F04D 29/644; F02C 3/04; F02K 3/06; F05D 2220/323; F05D 2230/60; F05D 2240/35; F05D 2240/80; F05D 2260/30; F05D 2300/431

See application file for complete search history.

(56) References Cited

U.S. PATENT DOCUMENTS

| 4,655,682 A | * | 4/1987 | Kunz | ............... F01D 9/042 |
| | | | | 415/119 |
| 5,062,767 A | * | 11/1991 | Worley | ............ F01D 9/042 |
| | | | | 415/190 |
| 6,409,472 B1 | * | 6/2002 | McMahon | ........ F01D 5/3023 |
| | | | | 415/119 |

(Continued)

FOREIGN PATENT DOCUMENTS

| EP | 1079074 A1 | 2/2001 |
| EP | 2620591 A2 | 7/2013 |

OTHER PUBLICATIONS

European Search Report for Application No. EP 17 19 7842.

*Primary Examiner* — Igor Kershteyn
(74) *Attorney, Agent, or Firm* — Cantor Colburn LLP (57) ABSTRACT

A stator assembly for a stator of a gas turbine engine is provided. The stator assembly having: a shroud defining a cavity; a plurality of inserts located within the cavity, each of the plurality of inserts defining a cavity; a plurality of vanes secured to the shroud, wherein each of the plurality of vanes has a tab portion located in the cavity of the shroud; and a rubber material disposed in the cavity of the shroud, the rubber material securing the tab portion of each of the plurality of vanes to the shroud.

20 Claims, 5 Drawing Sheets

(56) References Cited

U.S. PATENT DOCUMENTS

| | | | |
|---|---|---|---|
| 6,543,995 B1* | 4/2003 | Honda | F01D 9/041 |
| | | | 415/189 |
| 6,619,917 B2* | 9/2003 | Glover | F01D 9/042 |
| | | | 29/889.22 |
| 7,413,400 B2* | 8/2008 | Barnett | F01D 9/042 |
| | | | 415/119 |
| 9,434,031 B2* | 9/2016 | Feigleson | B23P 15/04 |
| 9,896,972 B2* | 2/2018 | Hoes | F01D 9/042 |
| 9,951,639 B2* | 4/2018 | Ivakitch | F01D 9/042 |
| 2013/0189092 A1* | 7/2013 | Dube | F01D 5/16 |
| | | | 415/200 |

\* cited by examiner

SHROUD FOR GAS TURBINE ENGINE

BACKGROUND

Exemplary embodiments of the present disclosure are directed to stator shrouds for a gas turbine engine and methods of sealing the stator shroud.

Stator shrouds may include poured rubber inner air seals (IAS) in order to provide vane damping and rotor to stator radial sealing. However, poured rubber inner air seals add to the overall weight of the engine.

Accordingly, it is desirable to provide a light weight stator shroud with an inner air seal.

BRIEF DESCRIPTION

In one embodiment, a stator assembly for a stator of a gas turbine engine is provided. The stator assembly having: a shroud defining a cavity; a plurality of inserts located within the cavity, each of the plurality of inserts defining a cavity; a plurality of vanes secured to the shroud, wherein each of the plurality of vanes has a tab portion located in the cavity of the shroud; and a rubber material disposed in the cavity of the shroud, the rubber material securing the tab portion of each of the plurality of vanes to the shroud.

In addition to one or more of the features described above, or as an alternative to any of the foregoing embodiments, the shroud may have a platform and a pair of wall members extending from the platform in a facing spaced relationship to define the cavity and wherein the rubber material may provide an inner air seal of the stator assembly.

In addition to one or more of the features described above, or as an alternative to any of the foregoing embodiments, the shroud may have a plurality of openings located in the platform and the tab portion of each of the plurality of vanes extends into the cavity through a respective one of the plurality of openings in the platform.

In addition to one or more of the features described above, or as an alternative to any of the foregoing embodiments, the rubber material covers the plurality of inserts and provides a bottom surface of the stator assembly.

In addition to one or more of the features described above, or as an alternative to any of the foregoing embodiments, the shroud may be an inner shroud and the plurality of vanes are secured to at an opposite end to an outer shroud.

In addition to one or more of the features described above, or as an alternative to any of the foregoing embodiments, the rubber material covers the plurality of inserts and provides a bottom surface of the stator assembly.

In addition to one or more of the features described above, or as an alternative to any of the foregoing embodiments, each of the plurality of inserts may be adjacent to at least one tab portion of the plurality of vanes.

In addition to one or more of the features described above, or as an alternative to any of the foregoing embodiments, wherein the stator assembly further includes: a pre-molded inner air seal secured to a bottom surface of the plurality of inserts, wherein a plurality of cavities are located between the rubber material and the pre-molded inner air seal after it is secured to the bottom surface of the plurality of inserts.

In addition to one or more of the features described above, or as an alternative to any of the foregoing embodiments, the pre-molded inner air seal may have pre-molded end portions located at opposite ends of the stator assembly.

In addition to one or more of the features described above, or as an alternative to any of the foregoing embodiments, the pre-molded inner air seal may have end portions applied to the pre-molded inner air seal after it is secured to the stator assembly, wherein the end portions are located at opposite ends of the stator assembly.

In yet another embodiment, a gas turbine engine is provided. The gas turbine engine having: a fan section; a compressor section, the compressor section having a stator assembly, comprising: a shroud defining a cavity; a plurality of inserts located within the cavity, each of the plurality of inserts defining a cavity; a plurality of vanes secured to the shroud, wherein each of the plurality of vanes has a tab portion located in the cavity of the shroud; and a rubber material disposed in the cavity of the shroud, the rubber material securing the tab portion of each of the plurality of vanes to the shroud; a combustor section; and a turbine section.

In addition to one or more of the features described above, or as an alternative to any of the foregoing embodiments, the shroud may have a platform and a pair of wall members extending from the platform.

In addition to one or more of the features described above, or as an alternative to any of the foregoing embodiments, the shroud may have a plurality of openings located in the platform and the tab portion of each of the plurality of vanes extends into the cavity through a respective one of the plurality of openings in the platform.

In addition to one or more of the features described above, or as an alternative to any of the foregoing embodiments, the rubber material covers the plurality of inserts and provides a bottom surface of the stator assembly.

In addition to one or more of the features described above, or as an alternative to any of the foregoing embodiments, the shroud may be an inner shroud and the plurality of vanes are secured to at an opposite end to an outer shroud.

In addition to one or more of the features described above, or as an alternative to any of the foregoing embodiments, the rubber material covers the plurality of inserts and provides a bottom surface of the stator assembly.

In addition to one or more of the features described above, or as an alternative to any of the foregoing embodiments, the plurality of inserts may be adjacent to at least one tab portion of the plurality of vanes.

In addition to one or more of the features described above, or as an alternative to any of the foregoing embodiments, wherein the engine further includes: a pre-molded inner air seal secured to a bottom surface of the plurality of inserts, wherein a plurality of cavities are located between the rubber material and the pre-molded inner air seal after it is secured to the bottom surface of the plurality of inserts.

In addition to one or more of the features described above, or as an alternative to any of the foregoing embodiments, the pre-molded inner air seal may have pre-molded end portions located at opposite ends of the stator assembly.

In yet another embodiment, a method of securing vanes to a stator shroud of a stator assembly of a gas turbine engine is provided. The method including the steps of: securing a plurality of inserts to an inner surface of a cavity of the stator shroud, each of the plurality of inserts defining a cavity; inserting a tab portion of a plurality of vanes into the cavity of the stator shroud via an opening in the stator shroud; and applying a rubber material to the cavity of the stator shroud in order to secure the tab portion to the stator shroud.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
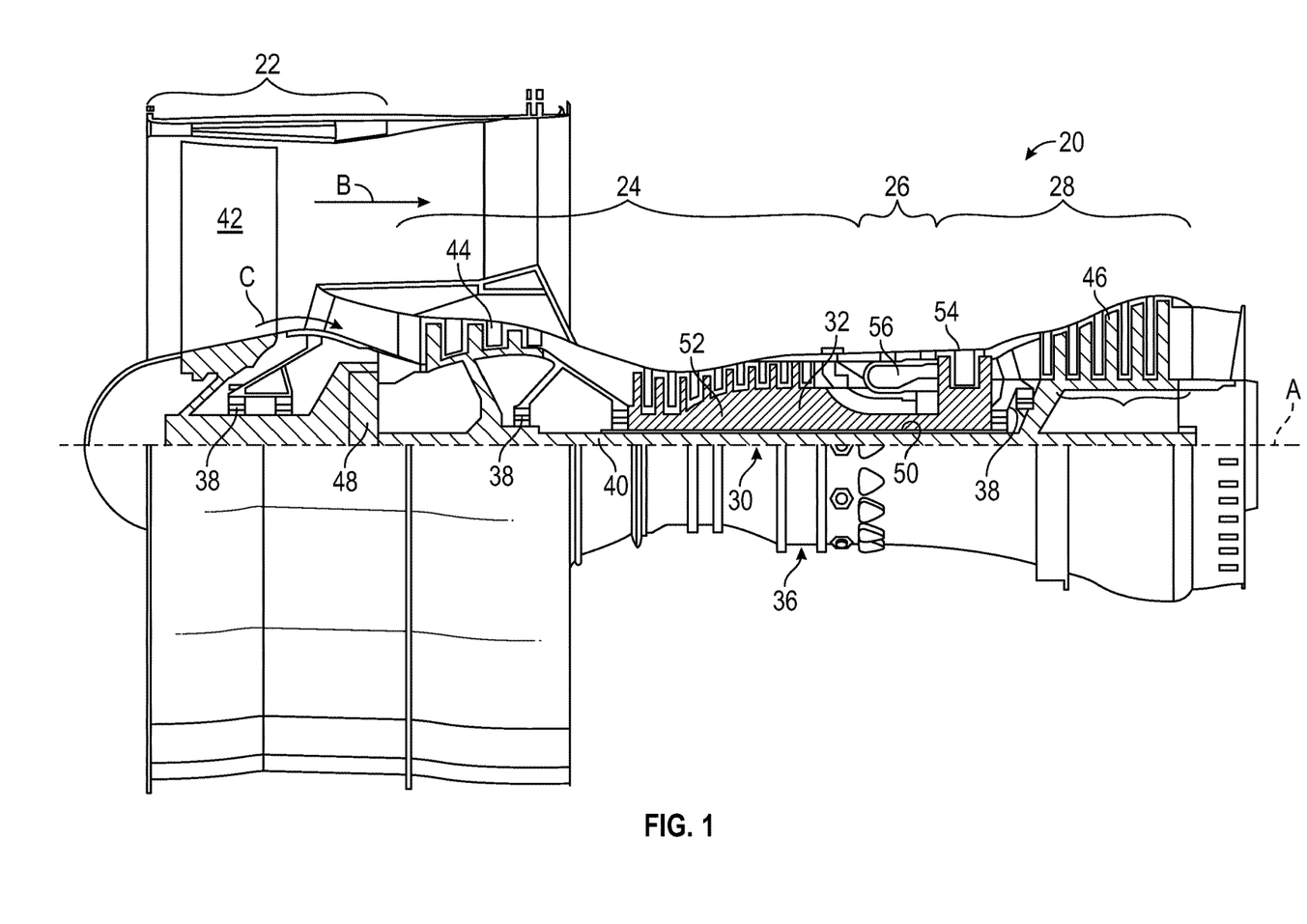
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]0.5$. The "Low corrected fan tip speed" as disclosed herein according to one non-limiting embodiment is less than about 1150 ft/second (350.5 m/sec).

Figure 2:
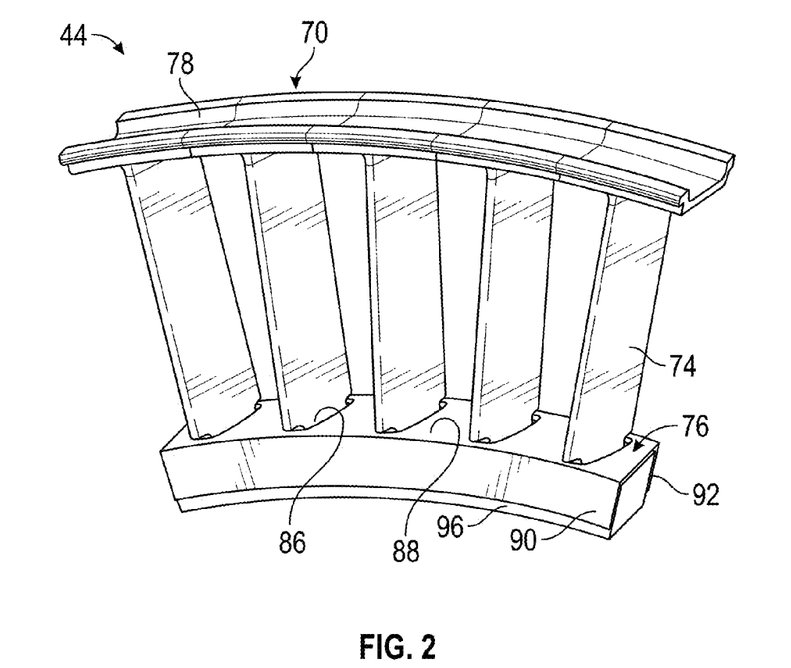
FIG. 2 is a perspective view of a stator assembly of the gas turbine engine.
Figure 3:
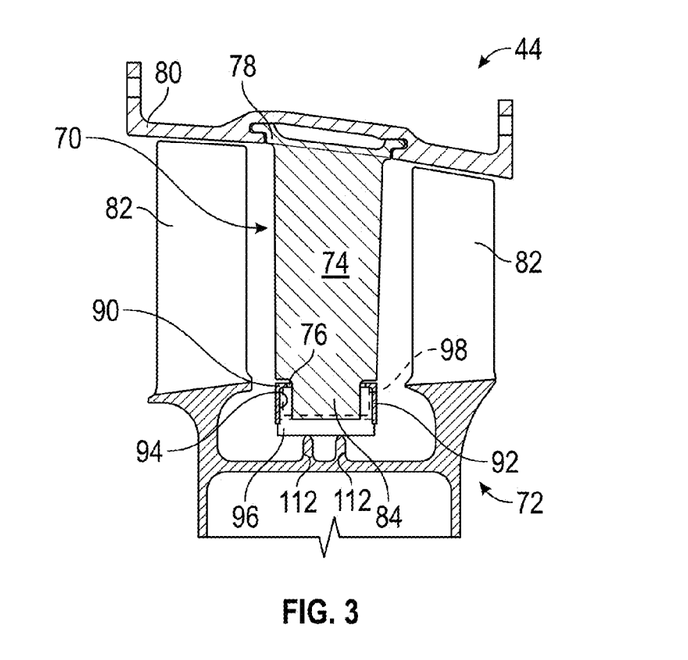
FIG. 3 is an end view of the stator assembly of the gas turbine engine illustrated in FIG. 2.

Referring now to FIGS. 2 and 3 a portion of the low pressure compressor 44 of the gas turbine engine 20 is illustrated. It is, of course, understood that various embodiments of the present disclosure may be applicable to other locations of the engine 20 including but not limited to the high pressure compressor 52. The low pressure compressor 44 may comprise a plurality of or at least one stator assembly 70 and a plurality of or at least one rotor assembly 72. The stator assembly 70 illustrated herein may be a portion or segment of continuous loop that is disposed about the axis A of the engine 20. In other words, a single stator of engine 20 may comprise a plurality of stator assemblies 70 located adjacent to each other to form a ring about the axis A. The illustrated stator assembly 70 may comprise a plurality of vanes or airfoils 74 extending from an inner shroud 76 to an outer shroud 78 of the stator assembly 70. As used herein inner shroud 76 refers to a portion of the stator assembly 70 that is closer in a radial direction to the axis A of the engine 20 than the outer shroud 78. In one embodiment, the outer shroud 78 may be integrally formed with the airfoil or vanes 74. The outer shroud 78 is secured to a case or blade outer air seal 80 of the gas turbine engine 20.

As illustrated in at least FIG. 3, the stator assembly 70 is located adjacent to a plurality of airfoils 82 of the rotor assembly 72, which rotate about the axis A of the gas turbine engine 20, while the stator assembly 70 remains in a fixed location with respect to the rotating rotor assembly 72.

In one embodiment, each of the airfoils or vanes 74 has a tab portion 84 that is received in an opening or slot 86 of the stator shroud 76. In one non-limiting embodiment, the stator shroud 76 may have a "C" shape when viewed from its end. Furthermore, the stator shroud 76 may be curved to provide a continuous loop about the axis A when a plurality of stator assemblies 70 are secured to the engine 20. The stator shroud 76 has a platform section 88 with a pair of opposing side walls 90 and 92 extending therefrom in a direction towards the axis A when the stator assembly 70 is secured to the engine 20. In the illustrated embodiment, the openings or slots 86 are located in the platform section 88 of the stator shroud 76.

Accordingly, the stator shroud 76 defines an internal cavity 94 into which the tabs 84 of the vanes or airfoils 74 are received. In order to secure, the vanes or airfoils 74 to the shroud 76 via tab portions 84, a rubber material 96 is poured into cavity 94 after the tabs 84 are inserted therein. In one embodiment, the pourable rubber material is silicone rubber or any other elastomeric material or equivalents thereof. Once cured, the pourable rubber material 96 provides vane damping and forms an inner air seal (IAS) of the stator assembly.

Figure 4:
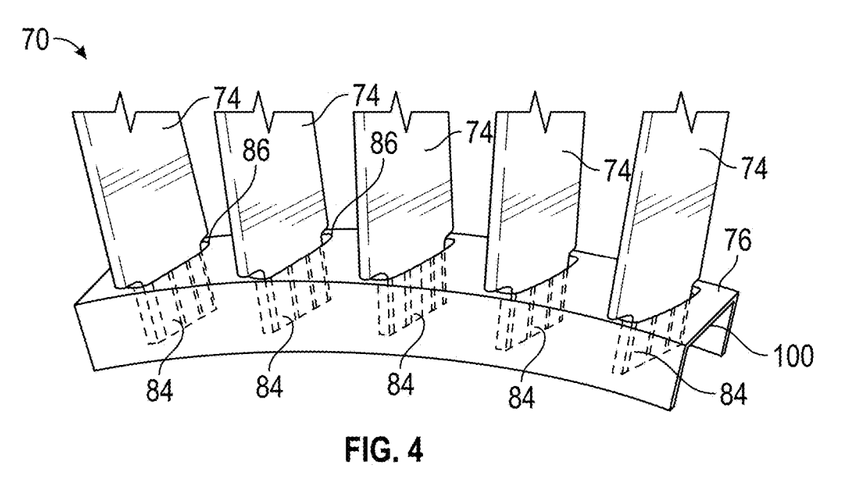
FIG. 4 is another perspective view of the stator assembly of the gas turbine engine.
Figure 5:
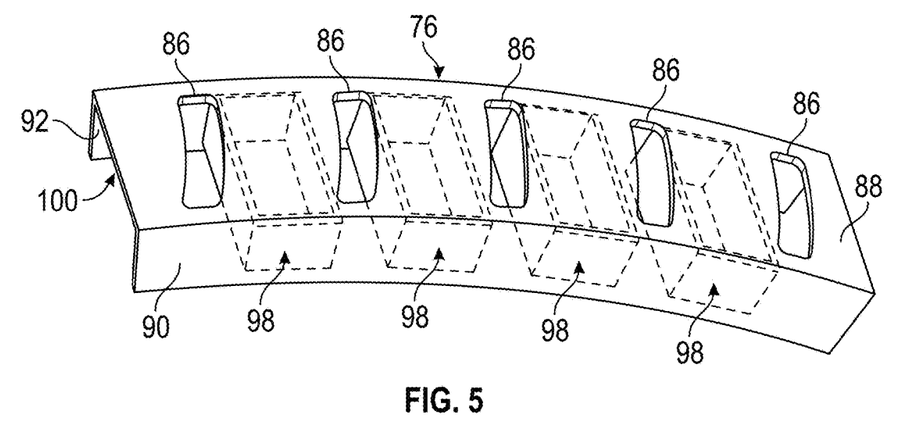
FIG. 5 is a perspective view of a stator shroud in accordance with an embodiment of the present disclosure.
Figure 6:
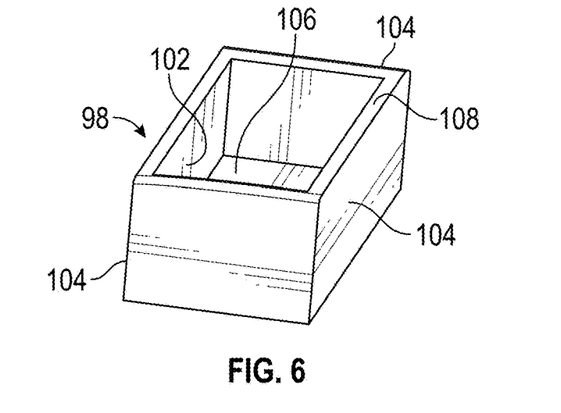
FIG. 6 is a perspective view of a stator shroud insert in accordance with an embodiment of the present disclosure.
Figure 7:
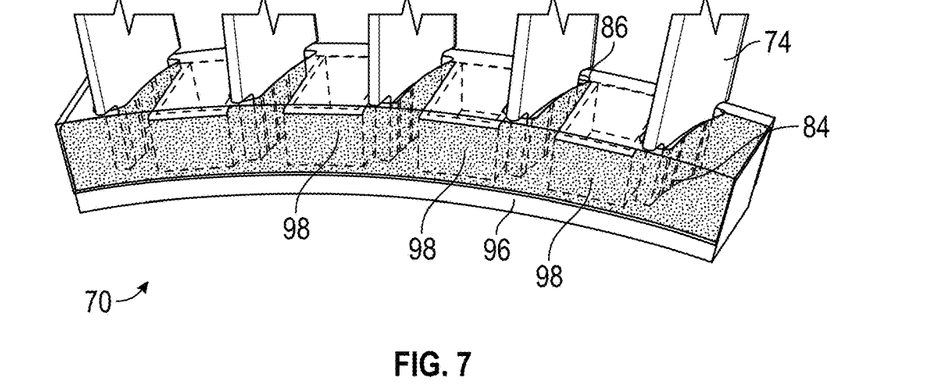
FIG. 7 is a perspective view of a portion of the stator assembly in accordance with an embodiment of the present disclosure.
Figure 8:
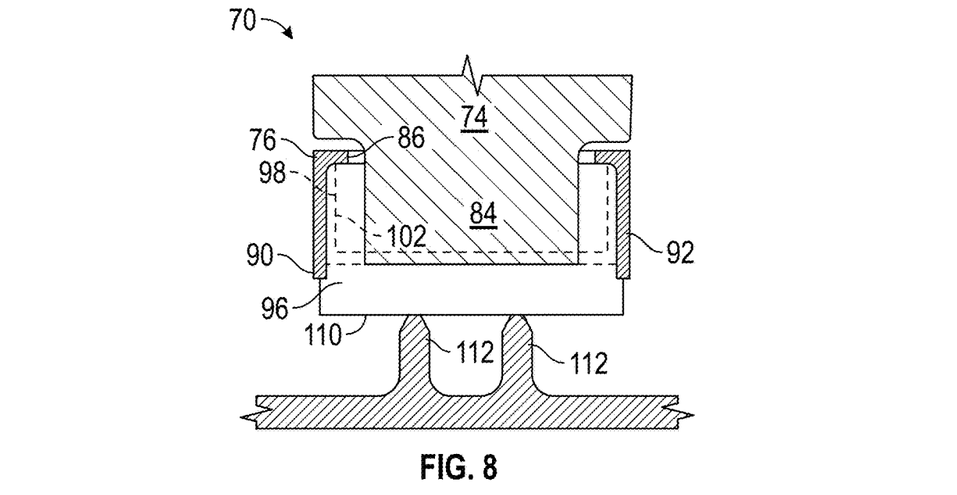
FIG. 8 is an end view of the stator assembly illustrated in FIG. 7.

As illustrated in at least FIG. 4, each of the tab portions 84 are spaced from each other. Referring now to at least FIGS. 4-8 and in order to avoid filing the entire cavity 94 with the rubber 96, a plurality of cavity inserts or shroud cavity inserts 98 are provided. The shroud cavity inserts or inserts 98 are located between the tab portions 84 of the vanes and are bonded to an inner surface 100 of the shroud 76 prior to final assembly, which includes the pouring or application of the rubber 96 into the cavity 94. Each of the cavity inserts 98 defines a hollow cavity 102 that reduces the volume of rubber 96 in the stator assembly 70. In one embodiment, the inserts 98 may be made from injection molded plastic to reduce cost and weight. As illustrated in at least FIG. 6, the inserts 98 may comprise a plurality of walls 104 with at least one surface member 106 (e.g., bottom surface member) that extends from the walls 106 to define a closed end to cavity 102 when the insert 98 is secured to the inner surface 100 of the shroud 76. For example and in one embodiment, an adhesive is applied to the edge 108 of walls 104 in order to secure edge 108 to the inner surface 100 of the shroud 76. Thereafter and in order to secure, the vanes 74 to the shroud 76 the rubber 96 is poured into the cavity 94 over the inserts 98 and about the tab portions 84 in order to secure them to the shroud 76 once the rubber 96 is cured. In addition and in this embodiment, the rubber 96 is also poured over the bottom surface member 106 of the inserts 98 thus, the inserts 98 are covered with the rubber 96. Once cured and as mentioned above, the rubber 96 provides an inner air seal. In addition, an exposed bottom surface 110 of the cured rubber 96 is in contact with the knife edge seals 112 of the rotor 72.

Alternatively, the inserts 98 may simply be formed as hollow blocks, cubes or members having an external surface that is secured to the inner surface 100 of the shroud 76 prior to the application of the rubber 96.

Figure 9:
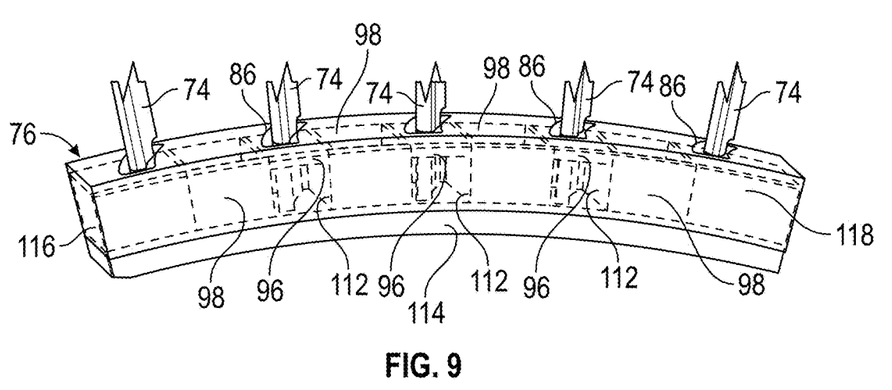
FIG. 9 is a perspective view of an alternative embodiment of the present disclosure.
Figure 10:
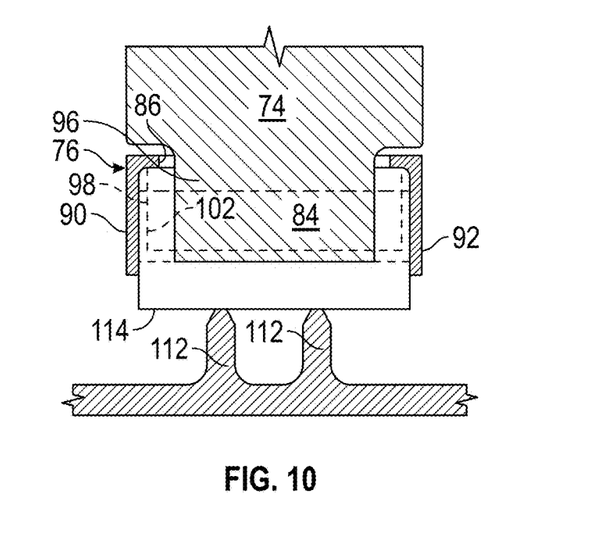
FIG. 10 is an end view of the stator shroud illustrated in FIG. 9.

Referring now to FIGS. 9 and 10, an alternative embodiment is illustrated. Here, additional cavities 112 can be created by potting the tabs 84 of the vanes 74 in rubber 96 after the inserts are secured to the inner surface 100. Thereafter, a pre-molded inner air seal 114 is secured to the bottom surface 106 of the inserts 98. In this embodiment, the pre-molded inner air seal 114 may have pre-molded end portions 116, 118 located at the ends of the stator assembly 70. The pre-molded end portions 116, 118 are configured to fill the cavity adjacent to the outermost vanes 74. Alternatively, the end portions 116, 118 may also be a poured rubber that is selectively applied after the pre-molded inner air seal 114 is secured to the bottom surface 106 of the inserts 98. In the embodiments illustrated in at least FIGS. 9 and 10, the rubber 96 is selectively applied about the tabs 84 and only has a thickness measured from the inner surface 100 sufficient to secure the vane 74 to the shroud 76 as well as providing the required dampening. Accordingly, a cavity 112 is provided once the pre-molded inner air seal 114 is attached to the stator assembly 70.

The cavities 102 introduced by the inserts 98 as well as cavities 112 will result in a weight savings for the stator assembly 70. The impact will vary depending on a number of factors such as diameter and vane counts. Further, this change can be incorporated with minimal to no changes to the stators overall configuration.

A method of securing vanes to a stator shroud of a stator assembly is also provided. In a first step, the plurality of inserts 98 are secured to the inner surface 100 of the stator shroud. In a second step or contemporaneously with the first step, the tab portion 84 of each of the plurality of vanes 74 is inserted into a respective opening 86 of the stator shroud 76. Alternatively, the tab portion 84 may be inserted before the securement of the inserts 98. Thereafter and in a third step after the tab portions 84 and the inserts 98 are located in the cavity 94. A rubber material 96 is applied in order to secure the vanes 74 to the shroud 76 as well as providing dampening to the vanes 74. The rubber material 96 may provide an exterior bottom surface 110 of the stator assembly 70 or alternatively, a separate inner air seal 114 may be applied in a separate step after the pouring of the rubber 96 in order to provide the exterior bottom surface 110 of the stator assembly 70.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator assembly for a stator of a gas turbine engine, comprising:
    a shroud defining a cavity;
    a plurality of inserts located within the cavity of the shroud, each of the plurality of inserts defining another cavity;
    a plurality of vanes secured to the shroud, wherein each of the plurality of vanes has a tab portion located in the cavity of the shroud; and
    a rubber material disposed in the cavity of the shroud, the rubber material securing the tab portion of each of the plurality of vanes to the shroud.

2. The stator assembly as in claim 1, wherein the shroud has a platform and a pair of wall members extending from the platform in a facing spaced relationship to define the cavity of the shroud and wherein the rubber material provides an inner air seal of the stator assembly.

3. The stator assembly as in claim 2, wherein the shroud has a plurality of openings located in the platform and the tab portion of each of the plurality of vanes extends into the cavity of the shroud through a respective one of the plurality of openings in the platform.

4. The stator assembly as in claim 3, wherein the rubber material covers the plurality of inserts and provides a bottom surface of the stator assembly.

5. The stator assembly as in claim 1, wherein the shroud is an inner shroud and the plurality of vanes are secured to at an opposite end to an outer shroud.

6. The stator assembly as in claim 1, wherein the rubber material covers the plurality of inserts and provides a bottom surface of the stator assembly.

7. The stator assembly as in claim 1, wherein each of the plurality of inserts is adjacent to at least one tab portion of the plurality of vanes.

8. The stator assembly as in claim 1, further comprising: a pre-molded inner air seal secured to a bottom surface of the plurality of inserts, wherein a plurality of cavities are located between the rubber material and the pre-molded inner air seal after it is secured to the bottom surface of the plurality of inserts.

9. The stator assembly as in claim 8, wherein the pre-molded inner air seal has pre-molded end portions located at opposite ends of the stator assembly.

10. The stator assembly as in claim 9, wherein the pre-molded inner air seal has end portions applied to the pre-molded inner air seal after it is secured to the stator assembly, wherein the end portions are located at opposite ends of the stator assembly.

11. A gas turbine engine, comprising:
    a fan section;
    a compressor section, the compressor section having a stator assembly, comprising:
        a shroud defining a cavity;
        a plurality of inserts located within the cavity of the shroud, each of the plurality of inserts defining another cavity;
        a plurality of vanes secured to the shroud, wherein each of the plurality of vanes has a tab portion located in the cavity of the shroud; and
        a rubber material disposed in the cavity of the shroud, the rubber material securing the tab portion of each of the plurality of vanes to the shroud;
    a combustor section; and
    a turbine section.

12. The gas turbine engine as in claim 11, wherein the shroud has a platform and a pair of wall members extending from the platform.

13. The gas turbine engine as in claim 11, wherein the shroud has a plurality of openings located in the platform and the tab portion of each of the plurality of vanes extends into the cavity of the shroud through a respective one of the plurality of openings in the platform.

14. The gas turbine engine as in claim 13, wherein the rubber material covers the plurality of inserts and provides a bottom surface of the stator assembly.

15. The gas turbine engine as in claim 11, wherein the shroud is an inner shroud and the plurality of vanes are secured to at an opposite end to an outer shroud.

16. The gas turbine engine as in claim 11, wherein the rubber material covers the plurality of inserts and provides a bottom surface of the stator assembly.

17. The gas turbine engine as in claim 11, wherein each of the plurality of inserts is adjacent to at least one tab portion of the plurality of vanes.

18. The gas turbine engine as in claim 11, further comprising: a pre-molded inner air seal secured to a bottom surface of the plurality of inserts, wherein a plurality of cavities are located between the rubber material and the pre-molded inner air seal after it is secured to the bottom surface of the plurality of inserts.

19. The gas turbine engine as in claim 18, wherein the pre-molded inner air seal has pre-molded end portions located at opposite ends of the stator assembly.

20. A method of securing vanes to a stator shroud of a stator assembly of a gas turbine engine, comprising:
    securing a plurality of inserts to an inner surface of a cavity of the stator shroud, each of the plurality of inserts defining another cavity;
    inserting a tab portion of a plurality of vanes into the cavity of the stator shroud via an opening in the stator shroud; and
    applying a rubber material to the cavity of the stator shroud in order to secure the tab portion to the stator shroud.

* * * * *